(12) United States Patent
Miyamoto et al.

(10) Patent No.: US 6,603,518 B1
(45) Date of Patent: Aug. 5, 2003

(54) LIQUID CRYSTAL DISPLAY CAPABLE OF REDUCING AMOUNT OF RETURN LIGHT TO TFT AND MANUFACTURING METHOD THEREFOR

(75) Inventors: Tadayoshi Miyamoto, Tenri (JP); Toshihiko Degawa, Yamatokooriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 377 days.

(21) Appl. No.: 09/618,802

(22) Filed: Jul. 18, 2000

(30) Foreign Application Priority Data

Jul. 19, 1999 (JP) .......................... 11-204587

(51) Int. Cl.⁷ ...................... G02F 1/136; G02F 1/1333
(52) U.S. Cl. .......................... 349/44; 349/110
(58) Field of Search .................. 349/44, 42, 43, 349/110; 257/59, 72

(56) References Cited

U.S. PATENT DOCUMENTS

| | | | |
|---|---|---|---|
| 5,790,213 A | 8/1998 | Sasaki et al. | 349/48 |
| 5,811,866 A * | 9/1998 | Hirata | 349/44 |
| 6,433,841 B1 * | 8/2002 | Murade et al. | 349/110 |

FOREIGN PATENT DOCUMENTS

| | | |
|---|---|---|
| JP | 1-100518 A | 4/1989 |
| JP | 6-138483 | 5/1994 |
| JP | 6-138483 A | 5/1994 |
| JP | 9-181322 A | 7/1997 |
| JP | 10-161151 A | 6/1998 |
| JP | 10-206889 | 8/1998 |
| JP | 11-84422 A | 3/1999 |
| KR | 1996-0011523 A | 4/1996 |

* cited by examiner

Primary Examiner—Robert H. Kim
Assistant Examiner—Dung Nguyen
(74) Attorney, Agent, or Firm—Nixon & Vanderhye, P.C.

(57) ABSTRACT

There is provided a liquid crystal display device, as well as a manufacturing method therefor, capable of preventing characteristic deterioration of TFTs by reducing the amount of return light incident on the TFTs. A light interception thin film 2 is composed of a silicide film formed on a transparent substrate 1 and a polysilicon film formed so as to cover a top of the silicide film, and a polysilicon film 3 is formed so as to cover a top of the light interception thin film 2. Then, by making up a light interception film from the light interception thin film 2 and the polysilicon film 3, the light interception effect on a TFT-use polysilicon layer 5 formed over the light interception film with interposition of the transparent insulation film 4, and enough thermal resistance and adhesion can be obtained in the TFT manufacturing process.

9 Claims, 5 Drawing Sheets

LIQUID CRYSTAL DISPLAY CAPABLE OF REDUCING AMOUNT OF RETURN LIGHT TO TFT AND MANUFACTURING METHOD THEREFOR

BACKGROUND OF THE INVENTION

The present invention relates to an active-matrix type liquid crystal display device using thin film transistors and to a manufacturing method therefor.

In recent years, active matrix display has been forming the mainstream of the display method for LCD (Liquid Crystal Display) devices. An LCD device of this active matrix type consists of two substrates and liquid crystals sandwiched between the two substrates, where switching devices formed in correspondence to pixels arrayed in a matrix shape as well as pixel electrodes connected to the switching devices are formed on one substrate, while an opposite electrode is formed on the other substrate. In the LCD device of this constitution, a display is effected by applying a display signal to between the pixel electrodes and the opposite electrode. More concretely, by applying a display voltage, the state of orientation of liquid crystals sandwiched between the two electrodes is changed, so that the quantity of light that is transmitted by these liquid crystals is controlled, by which a display is achieved.

As the switching devices, nonlinear devices such as thin film transistors (hereinafter, referred to as TFTs), diodes and the like are used. Among others, polysilicon TFTs that can be formed integrally with drive circuits of the LCD device and that are fast in response speed are commonly used. However, in the active matrix LCD device, even if light that impinges directly on the TFT is intercepted by limiting the direction of incidence of light, light that has passed through portions where no light interception film is formed may, in some cases, return to the TFT side as a result of reflection by optical part formed outside the LCD device (lens, polarizer, mirror etc.) or by the inner wall of the LCD device or the like. Particularly in the case of an LCD device used for projection type display devices, since very intense light is irradiated for enlarged projection of images, a large amount of light returns to the TFT side (return light), causing a considerable characteristic deterioration of TFTs due to this return light, as a problem.

Under these circumstances, to solve these and other problems, there has been proposed a structure in which a light interception film is formed on the TFT substrate side where a polysilicon TFT is formed, or over a region on the opposite substrate side corresponding to the site where the TFT is formed (e.g., Japanese Patent Laid-Open Publication HEI 6-138483). As one of such LCD devices, there has been provided an LCD device in which a polysilicon single layer is formed as a light interception film on the transparent substrate, the film thickness of the polysilicon single layer being set so that the return light is intercepted by the interference effect. However, in the LCD device, because of insufficient light interception of the polysilicon single layer itself as well as a difficulty of film thickness control in obtaining necessary light interception performance, there is a problem that enough light interception effect could not be obtained.

Figure 5:
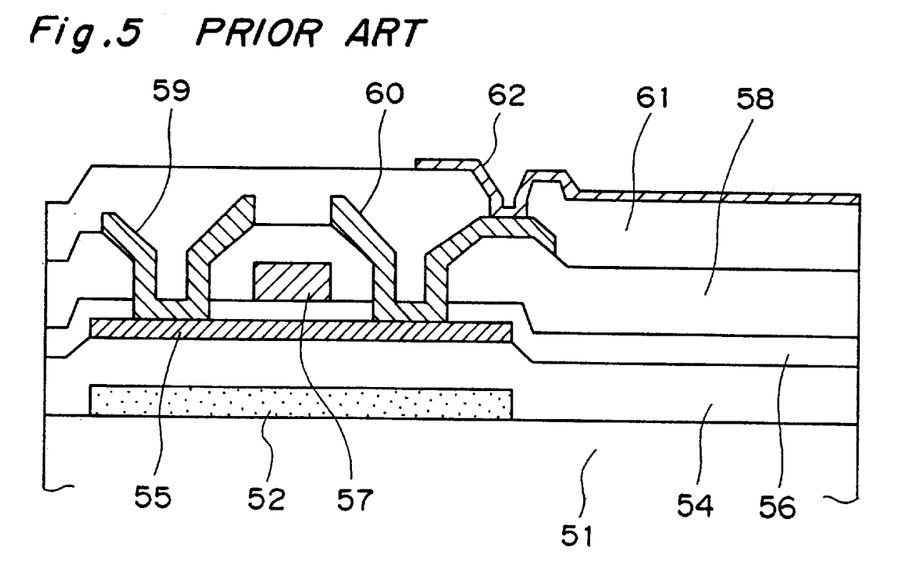
FIG. 5 is a sectional view of a TFT substrate of an LCD device according to the prior art.

Thus, there has been provided another LCD device, as shown in FIG. 5, in which a metal thin film is formed as a light interception film on a transparent substrate. This LCD device, as shown in FIG. 5, has a tantalum film 52 formed on a transparent substrate 51, a transparent insulation film 54 formed on the transparent substrate 51 and on the tantalum film 52, a TFT-use polysilicon layer 55 formed over a region on the transparent insulation film 54 corresponding to the tantalum film 52, a gate insulation film 56 formed on the transparent insulation film 54 and on the TFT-use polysilicon layer 55, a gate electrode 57 formed over a region on the gate insulation film 56 corresponding to a generally central portion of the TFT-use polysilicon layer 55, a first interlayer insulation film 58 formed on the gate insulation film 56 and on the gate electrode 57, TFT-use metal interconnections 59, 60 formed on both sides of the TFT-use polysilicon layer 55 and on the first interlayer insulation film 58, a second interlayer insulation film 61 formed on the first interlayer insulation film 58 and on the TFT-use metal interconnections 59, 60, and a pixel electrode 62 formed on the second interlayer insulation film 61 and partly connected to the TFT-use metal interconnection 60. By the formation of the metal thin film (tantalum film 52) as a light interception thin film on the transparent substrate 51, characteristic deterioration of TFTs due to the light that returns to the TFTs (return light) is prevented.

However, in the LCD device shown in FIG. 5, since only a metal thin film (tantalum film 52) is used as a light interception layer, poor adhesion is obtained between the metal thin film 52 and the transparent insulation film 54 formed on top of the metal thin film 52. As a result, there are problems that film peeling occurs due to high-temperature heat treatment in later TFT manufacturing process, and that light incident between the TFT and the metal thin film 52 is reflected by the metal thin film 52 so as to be incident on the TFT.

SUMMARY OF THE INVENTION

Therefore, an object of the present invention is to provide a liquid crystal display device, as well as a manufacturing method therefor, capable of preventing characteristic deterioration of TFTs by reducing the amount of return light incident on the TFTs, and of preventing film peeling even with high process temperatures.

In order to achieve the aforementioned object, in one aspect of the present invention, there is provided a liquid crystal display device comprising: a transparent substrate; a transparent insulation film formed on the transparent substrate; a semiconductor thin film transistor formed on the transparent insulation film; and a light interception film formed over a region corresponding to the semiconductor thin film transistor between the transparent substrate and the transparent insulation film, wherein the light interception film has a first thin film composed of silicide formed on or above the transparent substrate, and a second thin film composed of semiconductor formed so as to cover at least a top of the first thin film.

In the LCD device of this constitution, since the light interception film includes the first thin film made of silicide and the second thin film made of semiconductor deposited on at least top of the first thin film, light that returns to the TFT side (return light) can be intercepted more effectively, as compared with the light interception effect by a polysilicon single layer. Also, in comparison with a light interception film formed of a metal single layer, the adhesion between the first thin film made of silicide and the transparent substrate is improved, while the adhesion between the second thin film made of semiconductor and the transparent insulation film formed on the top of the second thin film is improved. A good adhesion is also obtained between the first thin film made of silicide and the second thin film made of semiconductor deposited on at least the top of the first thin film. Further, since the second thin film made of the semiconductor is formed on at least the top of the first thin film made of silicide, the return light that has entered between the TFT and the light interception film can be absorbed by the second thin film made of the semiconductor, so that reflection is suppressed. Thus, by effectively intercepting the return light incident on TFTs, an LCD device capable of preventing characteristic deterioration of the TFTs and moreover preventing film peeling even at high process temperatures can be realized.

In one embodiment of the invention, the first thin film is made of a high melting point metal silicide.

According to the LCD device of this embodiment, by using silicide having a high melting point metal material as the first thin film, the thermal resistance of the light interception film is improved, and in particular, a TFT can be produced at high process temperatures in the heat treatment of the TFT manufacturing process. Thus, a TFT of good characteristics can be obtained.

In one embodiment of the invention, the second thin film is made of a Si-series semiconductor or a Ge-series semiconductor.

According to the LCD device of this embodiment, by using Si-based semiconductor or Ge-based semiconductor as the semiconductor material of the second thin film, the adhesion of the second thin film with the transparent insulation film, such as silicon oxide or silicon nitride, formed on at least the top of the second thin film is further improved.

In one embodiment of the invention, the light interception film further comprises a third thin film made of semiconductor formed between the transparent substrate and the first thin film made of silicide.

According to the LCD device of this embodiment, by forming the third thin film made of semiconductor between the transparent substrate and the first thin film made of silicide, the adhesion between the light interception film and the transparent substrate is improved.

In one embodiment of the invention, the second thin film made of semiconductor covers a side portion of the first thin film made of silicide.

According to the LCD device of this embodiment, since the semiconductor thin film is formed also at a side portion of the first thin film made of silicide, impurities can be prevented from being mingling into the TFT-use polysilicon layer side due to thermal diffusion in the TFT manufacturing process. Thus, characteristic deterioration of TFTs due to adulterant impurities can be prevented.

In one embodiment, the semiconductor thin film transistor is a polysilicon thin film transistor.

In one embodiment, the transparent insulation film is a silicon oxide film or a silicon nitride film.

In one aspect of the invention, there is provided a method for manufacturing a liquid crystal display device comprising the steps of:

forming a first thin film made of silicide on or above a region on a transparent substrate above which a semiconductor layer of a semiconductor thin film transistor is to be formed;

forming a second thin film made of semiconductor on at least a top of the first thin film made of silicide;

forming a transparent insulation film on the transparent substrate and on the second thin film made of semiconductor; and forming the semiconductor layer of the semiconductor thin film transistor on a region on the transparent insulation film corresponding to the first thin film made of silicide.

According to the LCD device manufacturing method of this constitution, since the melting point of the silicon film is about 1400° C. and the melting point of the silicide film is 1300–1500° C. or higher, enough thermal resistance and light interception can be obtained not only when ordinary backlight is used but also when lamps that emit intense light such as projection-use halide lamps are used. Also, by using such a light interception structure, it becomes possible to implement a high-temperature heat treatment with the process highest temperature falling within a range of 900–1200° C. without causing any film peeling between the light interception film and the transparent insulation film or any characteristic deterioration of TFTs due to thermal diffusion. Thus, the TFT manufacturing processes can be carried out at high process temperatures, and a TFT of good characteristics can be obtained.

In one embodiment, the semiconductor thin film transistor is a polysilicon thin film transistor and the semiconductor layer is a polysilicon layer.

One embodiment further comprises a step for forming a third thin film made of semiconductor on the transparent substrate before forming the first thin film, the third thin film being placed between the transparent substrate and the first thin film.

In one embodiment, the third thin film is made of polysilicon.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the LCD device and its manufacturing method of the present invention are described in detail by way of embodiments thereof illustrated in the accompanying drawings.

First Embodiment

Figure 1:
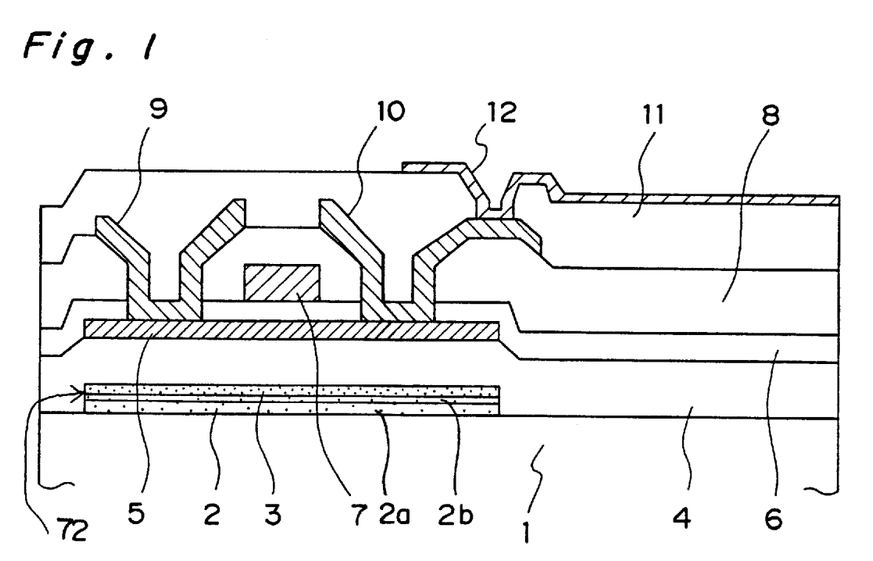
FIG. 1 is a main-part sectional view of a TFT substrate of an LCD device according to a first embodiment of the invention.

FIG. 1 shows a main-part sectional view of a TFT substrate used in an LCD device of a first embodiment of the invention. This TFT substrate for the LCD device, as shown in FIG. 1, has a light interception thin film 2 composed of first, third thin films 2b, 2a formed on a transparent substrate 1, a polysilicon film 3 as a second thin film formed on top of the light interception thin film 2, a transparent insulation film 4 formed on the transparent substrate 1 and on the polysilicon film 3, a TFT-use polysilicon layer 5 formed over a region on the transparent insulation film 4 corresponding to the light interception thin film 2, a gate insulation film 6 formed on the transparent insulation film 4 and on the TFT-use polysilicon layer 5, a gate electrode 7 formed over a region on the gate insulation film 6 corresponding to a generally central portion of the TFT-use polysilicon layer 5, a first interlayer insulation film 8 formed on the gate insulation film 6 and on the gate electrode 7, TFT-use metal interconnections 9, 10 formed on the first interlayer insulation film 8 and on both side regions of the TFT-use polysilicon layer 5, respectively, a second interlayer insulation film 11 formed on the first interlayer insulation film 8 and on the TFT-use metal interconnections 9, 10 and a pixel electrode 12 formed on the second interlayer insulation film 11 and partly connected to the TFT-use metal interconnection 10. The light interception thin film 2 and the polysilicon film 3 constitute a light interception film 72.

The manufacturing method of the TFT substrate for the LCD device having this structure is described with reference to FIGS. 2A–2F.

Figure 2A:
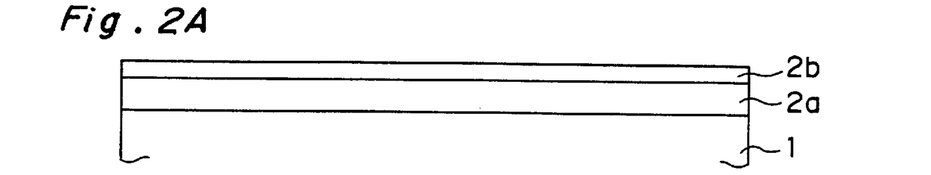
FIGS. 2A, 2B, 2C, 2D, 2E and 2F are views showing manufacturing process of the TFT substrate of the LCD device.

First, as shown in FIG. 2A, on a transparent substrate 1 given by, for example, a quartz substrate, a high-distortion point glass substrate or the like, a polysilicon film 2a as a third thin film is formed to a film thickness of about 50 nm by CVD (Chemical Vapor Deposition) process. Further, on the polysilicon film 2a, a silicide film 2b as a first thin film, which is a silicide of tungsten (W) that is a high melting point metal material, is formed to a film thickness of about 100 nm.

Figure 2B:
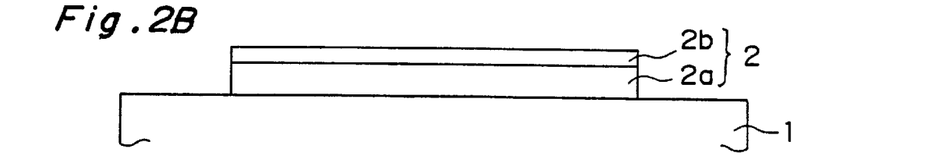

Next, as shown in FIG. 2B, an overcoat (not shown) is formed by photolithography process over a region where the TFT-use polysilicon layer 5 is to be formed. The polysilicon film 2a and the silicide film 2b in regions other than the region where the overcoat has been formed are removed by dry etching process with fluorine-based gas plasma. Thereafter, by performing a process at a high temperature of 950° C., a light interception thin film 2 composed of a film lamination of the polysilicon film 2a as the third thin film and the silicide film 2b as the first thin film is formed. Because the melting point of the polysilicon film 2a is about 1400° C. and the melting point of the silicide film 2b is 1300–1500° C. or higher, the light interception thin film 2 has enough thermal resistance as well as enough light interception, not only when ordinary backlight is used but also when lamps that emit intense light such as projection-use halide lamps are used. By using such a light interception structure, it becomes possible to implement a process in which a high-temperature heat treatment with a process temperature of 900–1200° C. is performed.

Figure 2C:
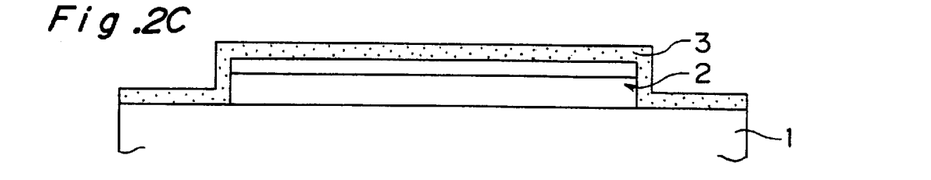

Next, as shown in FIG. 2C, the polysilicon film 3 as the second thin film is formed to a film thickness of about 50 nm all over the transparent substrate 1 with the light interception thin film 2 formed thereon.

Figure 2D:
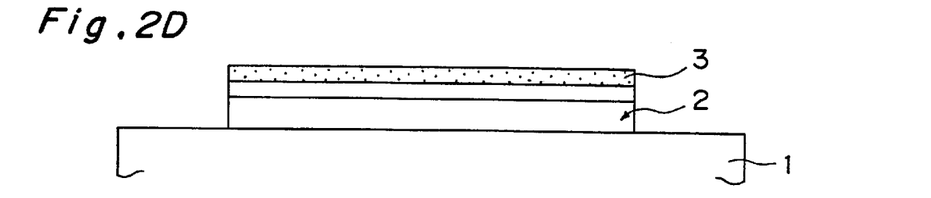

Thereafter, as shown in FIG. 2D, the polysilicon film 3 is patterned so as to overlap just on the light interception thin film 2 by the photolithography and dry etching processes.

Figure 2E:
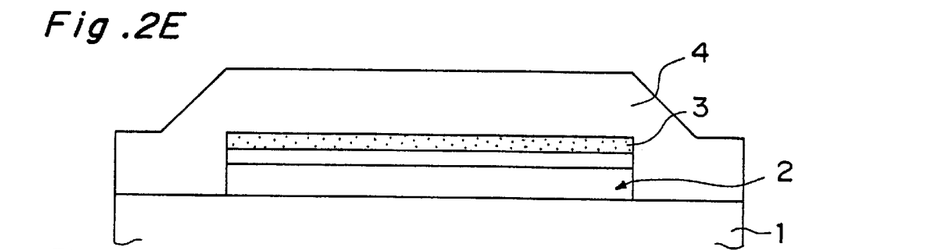

Next, as shown in FIG. 2E, all over the transparent substrate 1 on which the light interception thin film 2 and the polysilicon film 3 have been formed so as to overlap on each other, the transparent insulation film 4 is formed to a film thickness of about 380 nm so that the TFT-use polysilicon layer 5 to be formed in later steps is electrically insulated.

Figure 2F:
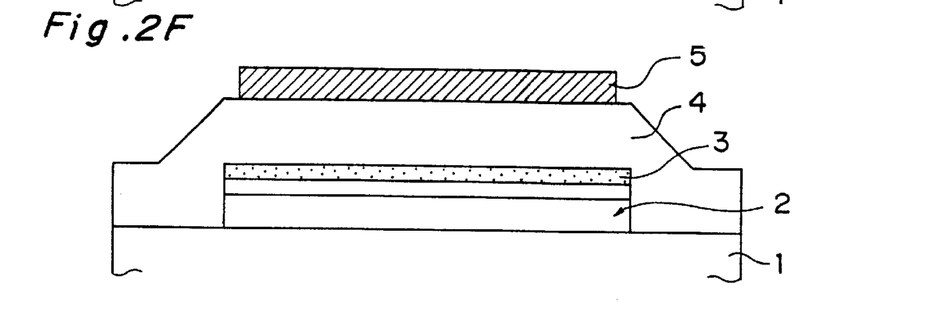

Next, as shown in FIG. 2F, all over the transparent insulation film 4, amorphous silicon is deposited to a film thickness of about 65 nm by LPCVD (Low Pressure Chemical Vapor Deposition) process using decomposition of $SiH_4$ or $Si_2H_6$, and then a crystallization process is performed, by which the TFT-use polysilicon layer 5 is formed.

After this onward, in the same way as in the manufacturing method of TFT substrates for common LCD devices, the gate insulation film 6, the gate electrode 7, the TFT-use metal interconnections 9, 10, the pixel electrode 12 and the like shown in FIG. 1 are formed.

As shown above, between the transparent substrate 1 and the TFT-use polysilicon layer 5, a light interception film 72 is formed from the silicide film 2b as the first thin film made of silicide, and the polysilicon film 3 as the second thin film made of semiconductor deposited on the silicide film 2b. As a result of this, the light that returns to the TFT side (return light) can be intercepted even more effectively, as compared with the light interception effect using a polysilicon single layer. Further, in comparison with a light interception film formed of a metal single layer, better adhesion can be obtained between the silicide film 2b and the polysilicon film 3 deposited on top of the silicide film 2b, and besides the adhesion between the polysilicon film 3 and the transparent insulation film 4 formed thereon is improved. Also, since the polysilicon film 3 is formed on the top of the silicide film 2b, the return light that has entered between the TFT-use polysilicon layer 5 and the light interception film 72 can be absorbed by the polysilicon film 3, so that reflection is suppressed.

By using a high melting point metal material silicide for the silicide film 2b as the first thin film, TFTs can be formed at high process temperatures in later heat treatment in the TFT manufacturing process, so that TFTs of good characteristics can be obtained.

Also, by using the polysilicon film 3 as the second thin film, the adhesion between the light interception film 72 and the transparent insulation film 4 is improved because the transparent insulation film 4 is formed on the top of the polysilicon film 3.

Also, by forming the polysilicon film 2a as the third thin film made of semiconductor between the transparent substrate 1 and the silicide film 2b as the first thin film, the adhesion between the transparent substrate 1 and the light interception film 72 is further improved. Therefore, when the process temperature in later TFT manufacturing process is a high temperature of 900° C. or higher, occurrence of film peeling can be prevented, as compared with the case where silicide film having a high melting point metal material is formed directly on the transparent substrate 1.

Also, by optimizing the film thickness of the polysilicon film 3 as the second thin film so that light reflection is canceled by the interference effect in combination with the transparent insulation film 4 formed on top thereof, reflected light can be prevented from being incident on the TFT. Thus, the problem that TFT characteristics are deteriorated due to a turn-off leak current of TFTs can be improved.

Second Embodiment

Figure 3:
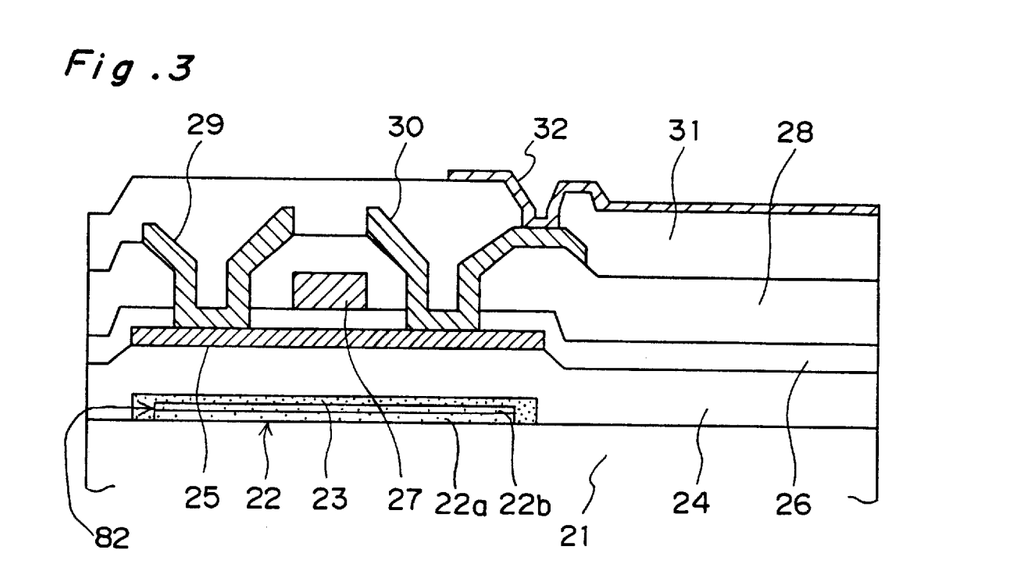
FIG. 3 is a main-part sectional view of a TFT substrate of an LCD device according to a second embodiment of the invention.

FIG. 3 shows a main-part sectional view of a TFT substrate used in the LCD device of a second embodiment of the invention. The TFT substrate of this LCD device has the same constitution as the TFT substrate of the LCD device of the first embodiment, except a light interception film 82.

The TFT substrate for LCD devices, as shown in FIG. 3, has a light interception thin film 22 composed of first, third thin films 22b, 22a formed on a transparent substrate 21, a polysilicon film 23 as a second thin film formed so as to cover a top portion and a side portion of the light interception thin film 22, a transparent insulation film 24 formed on the transparent substrate 21 and on the polysilicon film 23, a TFT-use polysilicon layer 25 formed over a region on the transparent insulation film 24 corresponding to the light interception thin film 22, a gate insulation film 26 formed on the transparent insulation film 24 and on the TFT-use polysilicon layer 25, a gate electrode 27 formed over a region on the gate insulation film 26 corresponding to a generally central portion of the TFT-use polysilicon layer 25, a first interlayer insulation film 28 formed on the gate insulation film 26 and on the gate electrode 27, TFT-use metal interconnections 29, 30 formed on the first interlayer insulation film 28 and both side regions of the TFT-use polysilicon layer 25, respectively, a second interlayer insulation film 31 formed on the first interlayer insulation film 28 and on the TFT-use metal interconnections 29, 30, and a pixel electrode 32 formed on the second interlayer insulation film 31 and partly connected to the TFT-use metal interconnection 30. The light interception thin film 22 and the polysilicon film 23 constitute a light interception film 82.

The manufacturing method of the TFT substrate for LCD devices having this structure is described with reference to FIGS. 4A–4F.

Figure 4A:
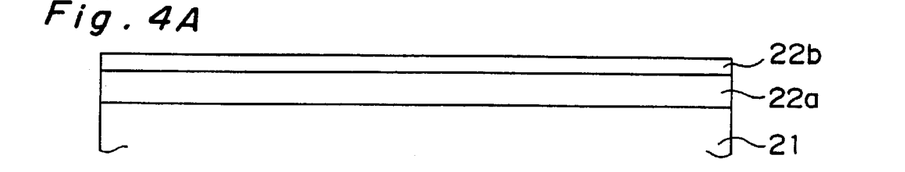
FIGS. 4A, 4B, 4C, 4D, 4E and 4F are views showing manufacturing process of the TFT substrate of the LCD device.

First, as shown in FIG. 4A, on a transparent substrate 1 given by, for example, a quartz substrate, a high-distortion point glass substrate or the like, a polysilicon film 22a as a third thin film is formed to a film thickness of about 50 nm by CVD process. Further, on the polysilicon film 22a, a silicide film 22b as a first thin film, which is made of a silicide of tungsten (W) that is a high melting point metal material, is formed to a film thickness of about 100 nm.

Figure 4B:
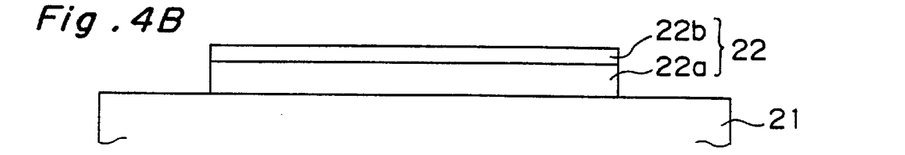
Figure 4C:
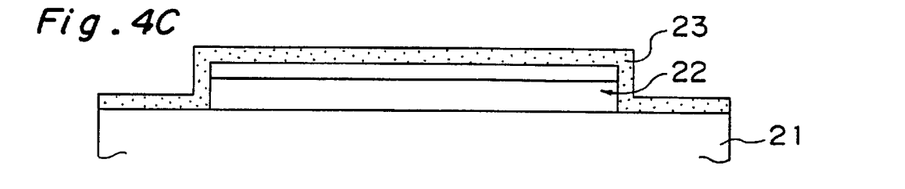
Figure 4D:
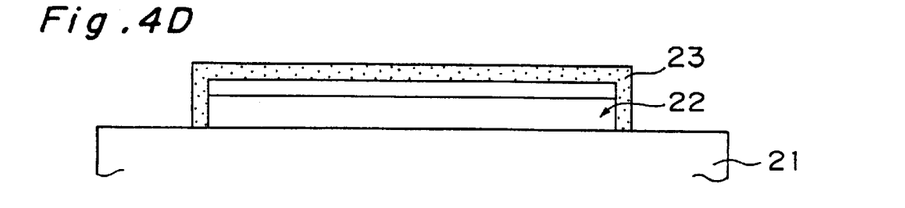
Figure 4E:
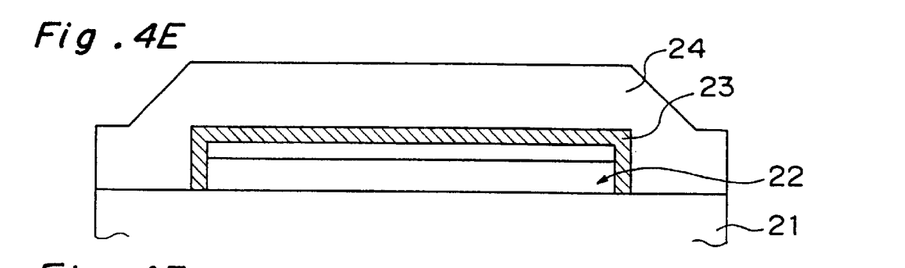

Next, as shown in FIG. 4B, an overcoat (not shown) is formed by photolithography process over a region where the TFT-use polysilicon layer 25 shown in FIG. 4E is to be formed. The polysilicon film 22a and the silicide film 22b in regions other than the region where the overcoat has been formed are removed by dry etching process with fluorine-based gas plasma. Thereafter, by performing a process at a high temperature of 950° C., a light interception thin film 22 composed of a film lamination of the polysilicon film 22a and the silicide film 22b is formed. Because the melting point of the polysilicon film 22a is about 1400° C. and the melting point of the silicide film 22b is 1300–1500° C. or higher, the light interception thin film 22 has enough thermal resistance, as well as enough light interception, not only when ordinary backlight is used but also when lamps that emit intense light such as projection-use halide lamps are used. By using such a light interception structure, it becomes possible to implement a process in which a high-temperature heat treatment with a process temperature of 900–1200° C. is performed.

Next, as shown in FIG. 4C, the polysilicon film 23 as the second thin film is formed to a film thickness of about 50 nm all over the transparent substrate 21 with the light interception thin film 22 formed thereon.

Thereafter, as shown in FIG. 4D, the polysilicon film 23 is formed so as to overlap a top portion and a side portion of the light interception thin film 22 by the photolithography and dry etching processes.

Next, as shown in FIG. 4E, all over the transparent substrate 21 on which the light interception thin film 22 and the polysilicon film 23 have been formed so as to overlap on each other, the transparent insulation film 24 is formed to a film thickness of about 380 nm so that the TFT-use polysilicon layer 25 to be formed in later steps is electrically insulated.

Figure 4F:
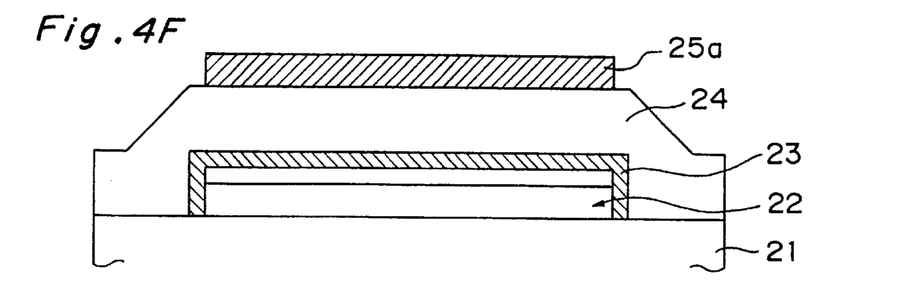

Next, as shown in FIG. 4F, all over the transparent insulation film 24, amorphous silicon is depoited to a film thickness of about 65 nm by LPCVD process using decomposition of $SiH_4$ or $Si_2H_6$. Subsequently, a crystallization process is performed, by which the TFT-use polysilicon layer 25 is formed.

After this onward, in the same way as in the manufacturing method of TFT substrates for common LCD devices, the gate insulation film 26, the gate electrode 27, the TFT-use metal interconnections 29, 30, the pixel electrode 32 and the like shown in FIG. 3 are formed.

This LCD device has the same effects as those of the LCD device of the first embodiment. Besides by forming the polysilicon film 23 as the second thin film also on a side portion of the silicide film 22b as the first thin film, impurities derived from the silicide film 22b due to thermal diffusion in later TFT manufacturing process can be prevented from mingling into the TFT-use polysilicon layer 25. Thus, characteristic deterioration of TFTs due to adulterant impurities can be prevented.

In the first, second embodiments, tungsten (W) is used as the high melting point metal material for the silicide film 2b, 22b as the first thin film. However, without being limited to this, the high melting point metal material may be tantalum (Ta), titanium (Ti), molybdenum (Mo), chromium (Cr), nickel (Ni) or the like. In addition, when the process temperature is not so high, the first thin film may be made of a material other than high melting point metals.

Also, in the first, second embodiments, polysilicon (Poly-Si) is used for the polysilicon film 3, 23 as the second thin film as well as for the polysilicon film 2a, 22a as the third thin film. However, without being limited to this, the second, third thin films may be made by using semiconductor thin films of amorphous silicon (a-Si), microcrystal silicon ($\mu$c-Si), polygermanium (Poly-Ge), amorphous germanium (a-Ge), polySi-xGex series, amorphous Si-xGex series, or the like, in which case also similar effects can be obtained. In addition, the second, third thin films may be given by using other semiconductors, as required, according to the transparent substrate, the transparent insulation film, and the like, without being limited to Si-series, Ge-series semiconductors.

Further, in the first, second embodiments, the polysilicon layer 2a, 22a as the third thin film made of semiconductor is formed between the transparent substrate 1, 21 and the first thin film 2b, 22b made of silicide. However, the third thin film may be omitted.

As apparent from the above description, according to the LCD device of the present invention, since the second thin film composed of semiconductor is formed on a top and/or a side portion of the first thin film composed of silicide so as to cover those portions, light that returns to the TFT side (return light) can be intercepted more effectively. Therefore, a remarkable improvement effect on TFT characteristics can be obtained, and problems as to display grade such as crosstalk can also be improved. Besides, such trouble as film peeling or incidence of reflected light from the metal single layer onto the TFT, which may occur when a metal single layer is used for the light interception film, can be solved. Furthermore, the problem that characteristic deterioration of TFTs is caused by adulteration of impurities (material of the metal single layer) into the TFT-use polysilicon layer due to thermal diffusion can also be solved with simplicity.

Further, according to the LCD device manufacturing method of the present invention, a small-size, high-definition and high-aperture-rate TFT substrate for transmission LCD devices can be manufactured.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:
   a transparent substrate;
   a transparent insulation film formed on the transparent substrate;
   a semiconductor thin film; and
   a light interception film formed over a region corresponding to the semiconductor thin film transistor between the transparent substrate and the transparent insulation film, wherein
   the light interception film has a first thin film composed of silicide formed on or above the transparent substrate, and a second thin film composed of semiconductor formed so as to cover at least a top of the first thin film; and
   the light interception film further comprises a third thin film made of semiconductor formed between the transparent substrate and the first thin film made of silicide.

2. The liquid crystal display device according to claim 1, wherein the first thin film is made of a high melting point metal silicide.

3. The liquid crystal display device according to claim 1, wherein the second thin film is made of a Si-series semiconductor or a Ge-series semiconductor.

4. The liquid crystal display device according to claim 1, wherein the second thin film made of semiconductor covers a side portion of the first thin film made of silicide.

5. The liquid crystal display device according to claim 1, wherein the semiconductor thin film transistor is a polysilicon thin film transistor.

6. The liquid crystal display device according to claim 1, wherein the transparent insulation film is a silicon oxide film or a silicon nitride film.

7. A method for manufacturing a liquid crystal display device comprising the steps of:
   forming a first thin film made of silicide on or above a region on a transparent substrate above which a semiconductor layer of a semiconductor thin film transistor is to be formed;
   forming a second thin film made of semiconductor on at least a top of the first thin film made of silicide;
   forming a third thin film made of semiconductor on the transparent substrate before forming the first thin film, the third thin film being placed between the transparent substrate and the first thin film;
   forming a transparent insulation film on the transparent substrate and on the second thin film made of semiconductor; and
   forming the semiconductor layer of the semiconductor thin film transistor on a region on the transparent insulation film corresponding to the first thin film made of silicide.

8. The method for manufacturing a liquid crystal display device according to claim 7, wherein the semiconductor thin film transistor is a polysilicon thin film transistor and the semiconductor layer is a polysilicon layer.

9. The method for manufacturing a liquid crystal display device according to claim 7, wherein the third thin film is made of polysilicon.

* * * * *